UNITED STATES PATENT OFFICE.

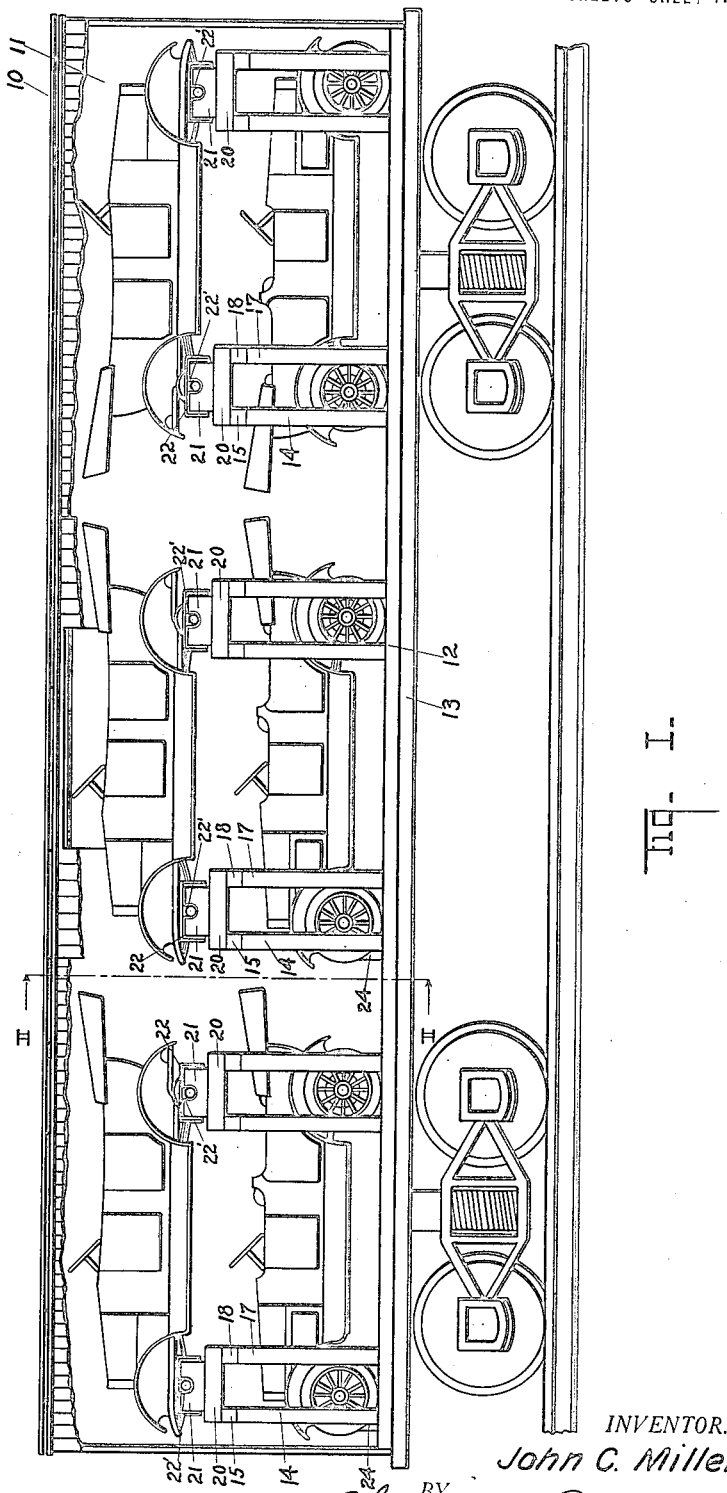

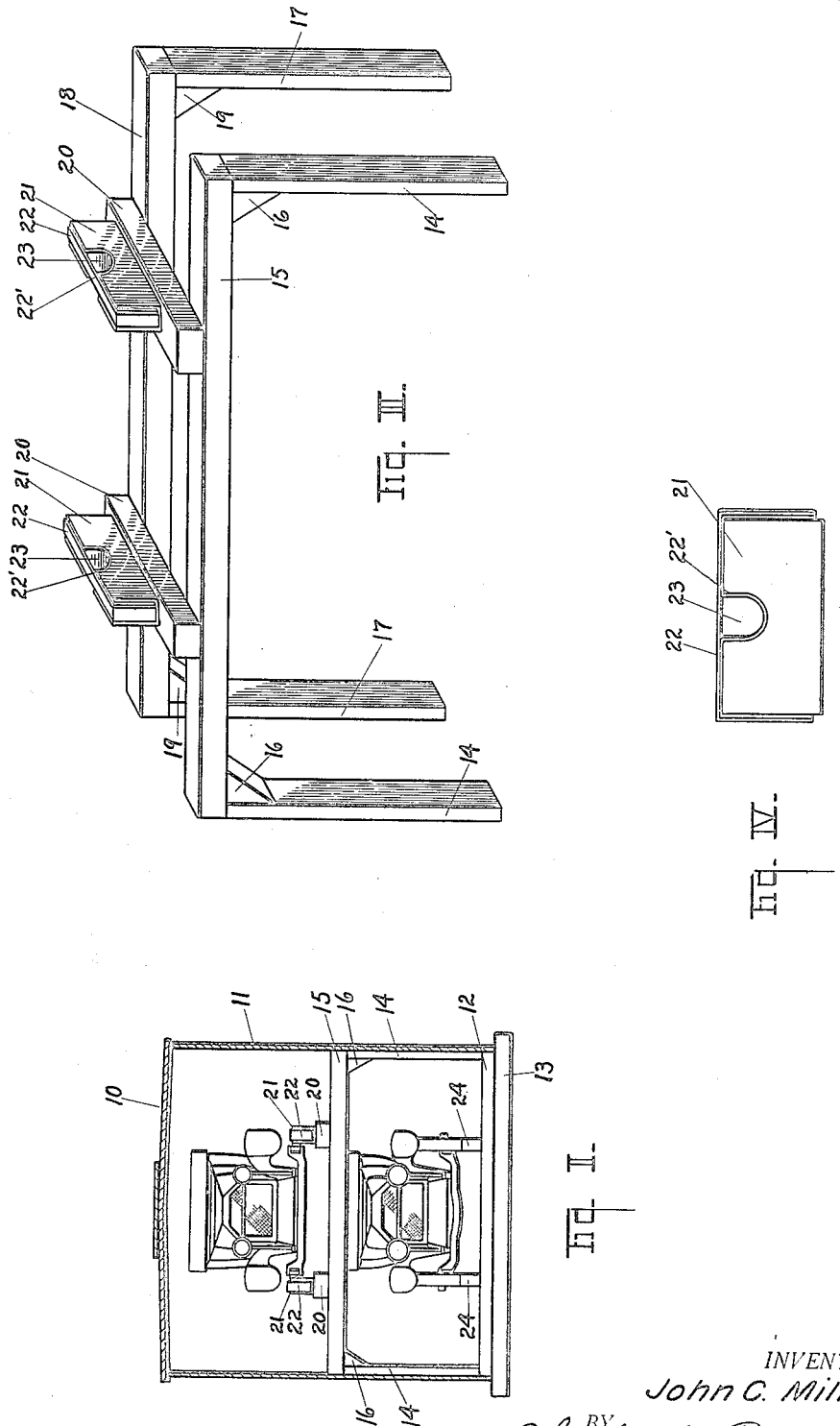

JOHN C. MILLER, OF TOLEDO, OHIO, ASSIGNOR TO THE WILLYS-OVERLAND COMPANY, OF TOLEDO, OHIO, A CORPORATION OF OHIO.

MEANS FOR SUPPORTING AUTOMOBILES IN FREIGHT-CARS.

1,379,773.      Specification of Letters Patent.      Patented May 31, 1921.

Application filed January 6, 1919. Serial No. 269,833.

*To all whom it may concern:*

Be it known that I, JOHN C. MILLER, a citizen of the United States, residing at Toledo, county of Lucas, and State of Ohio, have invented certain new and useful Improvements in Means for Supporting Automobiles in Freight-Cars, of which I declare the following to be a full, clear, and exact description.

My invention relates to means for supporting automobiles in freight cars.

One object of my invention is to provide an improved system of bracing and support, by means of which an automobile may be so supported in freight cars that one automobile may be loaded above the other in the freight car, such system of loading being commonly known as "double decking."

A further object of my invention is to provide such a system of bracing and support as will so support the automobile within the freight car as to guard against any injury due to strains which come upon the structure while the freight car is moving, and to accomplish this purpose with the greatest economy of lumber and labor which is possible.

Further objects of this invention relate to economies of manufacture and details of construction as will hereinafter appear from the detailed description to follow.

I accomplish the objects of my invention in one instance by the devices and means described in the following specification, but it is evident that the same may be varied without departing from the scope of the invention as pointed out in the appended claims.

A structure constituting one embodiment of my invention, which may be the preferred, is illustrated in the accompanying drawing, forming a part hereof, in which:

Figure I is a view in side elevation of a freight car having constructed therein a system of bracing and support embodying my invention, a side of the freight car being broken away for convenience in showing the bracing members and the automobiles in position for shipment.

Fig. II is a transverse sectional view of a portion of a freight car, showing the position of the bracing and supporting members with respect to the automobiles, and taken substantially along the line II—II of Fig. I.

Fig. III is a perspective view of one section of my improved bracing and supporting means.

Fig. IV is a view in side elevation of one of the blocks for supporting the end of an automobile axle.

In the drawing, similar reference characters refer to corresponding parts throughout the several views, and the sectional view is taken looking in the direction of the small arrows at the end of the section line.

Referring to the drawing, 10 represents a freight car of the usual construction having sides 11 and being provided with a flooring 12 which is supported by the sills 13. My improved system of bracing and support contemplates the use of a plurality of bracing and supporting sections, two of which are preferably employed for the support of a single automobile. One of my improved bracing and supporting sections is illustrated in Fig. III of the drawing, and comprises a pair of members 14 supporting upon their upper end a single transverse beam 15, which is firmly secured at each of its ends to the upright members 14. Bracing blocks 16 of suitable size and shape are preferably employed to assist in securing the ends of the transverse member to the uprights, the said blocks being firmly secured both to the transverse member and the uprights in any suitable manner. A second frame, similar in all respects to the frame just described, is composed of uprights 17 and a transverse member 18, provided as in the above described construction with blocks 19 to assist in securing the parts together. The two frame portions above described are connected by beams 20 positioned upon the two transverse members 15 and 18 and located at a sufficient distance from each other for the proper accommodation of an automobile axle thereon. The beams 20 are firmly secured to the transverse beams 15 and 18 in any suitable manner, as by being bolted thereto.

A block 21 provided with a recess 23 in its upper side for the reception of an end of an automobile axle, is firmly secured to each of the beams 20, and is provided with a strap 22 adapted to be securely attached to the block and to pass over the opening formed in its upper surface for the purpose of securing the end of the automobile axle therein. The block 21 is also provided with a strap 22' fitting closely against the top and sides of the block and against the upper surface formed by the recess 23 where it is adapted to underlie the end of the axle and prevent wear of the block by that portion of the axle which bears thereon. The straps 22 and 22' are firmly secured to the top and sides of the block for the purpose of preventing splitting or shattering of the same by reason of the strain imposed thereon.

As will be apparent from an inspection of the drawing, this system of bracing and support relates to that method of securing automobiles in freight cars for shipment commonly known as "double-decking." In this system of securing automobiles in freight cars for shipment, the upper automobile is raised a sufficient distance, preferably by an arrangement of blocks and tackles, to permit the insertion of one of my improved supporting sections under the front and rear wheels respectively. These sections are so constructed that the upright supporting members 14 and 17 extend to and abut against the side walls of the car, to which they are firmly secured by being bolted or otherwise fastened thereto.

The transverse members 15 and 18 extend the entire width of the car when in position for receiving an automobile and rest upon the upper ends of the upright supporting members 14 and 17. By this arrangement the sections are securely held in position, and when in place form in effect an integral part of the car structure. When the forward and rear sections have been placed in position, the automobile which has been raised to a point near the roof of the car is lowered upon the supporting sections in such a manner that the ends of the front and rear axles will lie within the recesses 23 formed in the upper surfaces of the blocks 21. The straps 22 are then passed over that portion of the respective axles which lies within the recesses 23, and securely fastened at their ends to the blocks 21 to firmly hold the axles in position therein.

Upon the positioning of the upper series of automobiles upon the supporting sections in the manner described, the lower series of automobiles may be placed in the car and secured in position by means of blocking 24 of any ordinary construction for holding the wheels in proper position.

It will be seen that by the use of this system of blocking and support, ample space is left for the positioning of the lower series of automobiles in position in the car and for their removal therefrom. It will also be apparent that by positioning the upright members 14 and 17 against the sides of the car and bolting the same thereto, much of the bracing structure usually found necessary in devices of this character may be dispensed with. Moreover, the upright members 14 and 17 and the transverse beams 15 and 18 will be more rigidly secured in position by reason of the fact that the same may be bolted directly to the sides of the freight car, than will be possible with the usual bracing and supporting structures of this character.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly, as well as specifically.

Having thus described my invention, what I claim as new and desire to secure by Letters Patent, is:

1. In a system for supporting automobiles in freight cars, a temporary knock-down frame comprising a plurality of uprights adapted to bear against and be secured to opposite sides of a freight car, each pair of oppositely arranged uprights being connected by a transverse beam which extends across the entire width of the car, and axle blocks supported by and between adjacent transverse beams.

2. In a system for supporting automobiles in freight cars, a temporary knock-down frame adapted to be applied to a freight car of the ordinary construction comprising a plurality of uprights secured directly to opposite sides of the freight car, each pair of oppositely arranged uprights being connected by a transverse beam extending entirely across the car and supports carried by and between adjacent transverse beams and provided with recesses for the reception of the end portions of an automobile axle.

3. In a system for supporting automobiles in freight cars whereby space is provided for a second automobile beneath the supported automobile, a detachable frame work for each end of each of the upper automobiles comprising a plurality of uprights adapted to bear against and be secured to each of the opposite sides of the car, transverse beams extending entirely across the car and connecting the upper ends of said uprights and supports carried by the transverse beams.

4. In a system for supporting automobiles in freight cars whereby space is provided for a second automobile beneath the supported automobile, detachable frames each adapted to support either the front or the rear end of the automobile and each comprising a plurality of uprights at each side of the car, transverse beams secured to the upper ends of corresponding uprights and extending entirely across the car, and recessed blocks secured to the transverse beams and adapted to receive and support the axles of the automobile.

5. In a system for supporting automobiles in freight cars whereby space is provided for a second automobile beneath the supported automobile, temporary knock-down frames each adapted to support either the front or the rear axle of the automobile and each comprising uprights lying against and secured to each of the opposite side walls of the freight car, transverse beams carried by the uprights and extending entirely across the car, and means on the transverse beams for supporting the front and rear axles of the automobile.

In testimony whereof, I affix my signature.

JOHN C. MILLER.